(12) United States Patent
Yi et al.

(10) Patent No.: US 10,802,863 B2
(45) Date of Patent: Oct. 13, 2020

(54) APPARATUS AND METHOD FOR STORING AUDIT TRAIL IN RESPONSE TO VIRTUAL-MACHINE PROCESS EXECUTION

(71) Applicant: ELECTRONICS AND TELECOMMUNICATIONS RESEARCH INSTITUTE, Daejeon (KR)

(72) Inventors: Hyunyi Yi, Incheon (KR); Sung-Jin Kim, Daejeon (KR); Woomin Hwang, Daejeon (KR); Seong-Joong Kim, Daejeon (KR); Chulwoo Lee, Daejeon (KR); Byung-Joon Kim, Daejeon (KR); Hyoung-Chun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 264 days.

(21) Appl. No.: 15/975,932

(22) Filed: May 10, 2018

(65) Prior Publication Data

US 2019/0012194 A1   Jan. 10, 2019

(30) Foreign Application Priority Data

Jul. 7, 2017  (KR) .......................... 10-2017-0086565
Sep. 5, 2017  (KR) .......................... 10-2017-0113224

(51) Int. Cl.
*G06F 9/445*   (2018.01)
*G06F 9/455*   (2018.01)
(Continued)

(52) U.S. Cl.
CPC ........ *G06F 9/45558* (2013.01); *G06F 11/301* (2013.01); *G06F 11/3024* (2013.01); *G06F 11/3495* (2013.01); *G06F 2009/45591* (2013.01)

(58) Field of Classification Search
CPC .................................................. G06F 9/45558
(Continued)

(56) References Cited

U.S. PATENT DOCUMENTS

| 9,117,080 B2 | 8/2015 | Lukacs et al. |
| 2015/0013008 A1* | 1/2015 | Lukacs ................... G06F 21/53 726/24 |

(Continued)

FOREIGN PATENT DOCUMENTS

| KR | 10-1405831 B1 | 6/2014 |
| KR | 10-2016-0030385 A | 3/2016 |
| KR | 10-2017-0041618 A | 4/2017 |

*Primary Examiner* — Timothy A Mudrick
(74) *Attorney, Agent, or Firm* — LRK Patent Law Firm (57) ABSTRACT

An apparatus and method for storing an audit trail in response to execution of a virtual-machine process. The method for storing an audit trail, performed by the apparatus for storing an audit trail in response to execution of a virtual-machine process, includes detecting execution of a process inside a virtual machine, determining whether the executed process is a monitoring target process and determining a type of the process, activating one or more monitoring events for monitoring at least one of an upload, a download and a drop by the process based on a result of the determination, and storing information about occurrence of the activated monitoring event as an audit trail.

20 Claims, 8 Drawing Sheets

(51) Int. Cl.
*G06F 11/30* (2006.01)
*G06F 11/34* (2006.01)

(58) Field of Classification Search
USPC .............................................. 718/1
See application file for complete search history.

(56) References Cited

U.S. PATENT DOCUMENTS

2015/0121135 A1\* 4/2015 Pape ................... G06F 9/45558
714/15
2017/0103202 A1 4/2017 Kim et al.

\* cited by examiner

APPARATUS AND METHOD FOR STORING AUDIT TRAIL IN RESPONSE TO VIRTUAL-MACHINE PROCESS EXECUTION

CROSS REFERENCE TO RELATED APPLICATIONS

This application claims priority to Korean Patent Application No. 10-2017-0086565, filed Jul. 7, 2017, and No. 10-2017-0113224, filed Sep. 5, 2017, which are hereby incorporated by reference in their entirety into this application.

BACKGROUND OF THE INVENTION

1. Technical Field

The present invention relates generally to technology for storing an audit trail in response to execution of a process in a virtual machine, and more particularly to technology in which, without installing a security agent in a virtual machine, execution of a process and inflow and outflow of data by the executed process are monitored and audit trails of the monitored activities are stored in a cloud-computing environment.

2. Description of Related Art

Some activities done after a user executes a process may result in various kinds of security incidents. For example, when a user uploads data using an email or a file-sharing service, corporation's sensitive data may be disclosed without authorization. Also, when a user executes an email attachment after downloading it or when a user accesses a website, malware may enter a system, which may result in cyber damage.

Particularly, in the case of infection with malware by drive-by downloads or document-based malware, it is difficult to detect when and how the malware entered a system.

In order to prevent security incidents, most companies and public organizations force the installation of commercial security software, thereby blocking predicted routes through which security incidents can occur. However, because a malicious user or malware frequently circumvents or incapacitates such barriers, security incidents, such as leakage of data or infection with malware, may occur.

Particularly, when such a security incident has occurred in a cloud-computing environment, it is not easy to secure evidence that is necessary in order to investigate the incident, for example, the method that was used for stealing data, the route through which data were leaked, the method used for the delivery of malware, a malware infection route, and the like.

In a cloud environment in which resources are frequently created, deleted and shared, when an incident is investigated after the occurrence thereof, there may be no evidential data, or it may not be easy to secure evidential data for various reasons. For example, a virtual disk including a virtual machine may be deleted, data may be moved to another location for distribution, or access to data may not be permitted because data are shared with another user. Also, depending on the circumstances, it may be required to collect and analyze a huge amount of data from disparate locations.

Accordingly, it is necessary to develop technology for easily securing analysis data in the event of a security incident in a cloud-computing environment. In connection with this, Korean Patent No. 10-1405831 discloses a technology related to "System and method for detecting host file of malicious execution code."

SUMMARY OF THE INVENTION

An object of the present invention is to record in real time, outflow and inflow of data by a user, which may cause a security incident, in a cloud-computing environment.

Another object of the present invention is to easily secure evidential data from the temporal vicinity of the time at which a security incident has occurred.

A further object of the present invention is to provide an audit trail storage method performed based on a hypervisor in order to solve a problem in which a malicious user or malware circumvents security measures in a virtual machine.

Yet another object of the present invention is to record, in real time, information about running processes and accessed files when a file suspected to be malware enters, and to prevent an incident caused by the file suspected to be malware from occurring.

In order to accomplish the above objects, a method for storing an audit trail, performed by an apparatus for storing an audit trail in response to execution of a virtual-machine process, according to the present invention includes detecting execution of a process inside a virtual machine; determining whether the executed process is a monitoring target process and determining a type of the process; activating one or more monitoring events for monitoring at least one of an upload, a download, and a drop by the process based on a result of the determination; and storing information about occurrence of the activated monitoring event as an audit trail.

Here, the monitoring event may include at least one of an executable file creation monitoring event, a user selection download monitoring event, a file upload monitoring event, a file creation monitoring event, and an abnormal behavior monitoring event.

Here, activating the monitoring event may be configured to activate at least one of the file upload monitoring event and the user selection download monitoring event when the process, the execution of which is detected, is a monitoring target process and when the process, the execution of which is detected, is a browser process.

Here, activating the monitoring event may be configured to activate the executable file creation monitoring event when the process, the execution of which is detected, is a monitoring target process and when the process, the execution of which is detected, is a document-viewer process.

Here, the method may further include determining whether an audit trail corresponding to the process, the execution of which is detected, is stored when it is determined that the process, the execution of which is detected, is not a monitoring target process.

Here, activating the monitoring event may be configured to activate at least one of an event for monitoring termination of the process, the file creation monitoring event, and the abnormal behavior monitoring event when it is determined that the audit trail corresponding to the process, the execution of which is detected, is stored.

Here, detecting the execution of the process may be configured to detect the execution of the process inside the virtual machine based on a system call provided by a kernel of a guest operating system in the virtual machine.

Here, detecting the execution of the process may be configured to set a breakpoint on a system call that is invoked when a process is executed and to acquire a structure address that points to information about the process when the set breakpoint is hit.

Here, activating the monitoring event may be configured to search for a virtual address of a library loaded by the monitoring target process using the acquired structure address and to set an API breakpoint at an address of a user API that is called when the monitoring event occurs.

Here, storing the information as the audit trail may include checking a monitoring target process context with reference to a register of the virtual machine when the API breakpoint is hit; and storing information about the occurrence of the monitoring event, corresponding to the address of the API breakpoint, as the audit trail when the process is determined to be a monitoring target process.

Also, an apparatus for storing an audit trail in response to execution of a virtual-machine process according to an embodiment of the present invention includes a process execution detection unit for detecting at least one of execution and termination of a process inside a virtual machine, determining whether the process is a monitoring target process, and determining a type of the process; a process audit unit for activating one or more monitoring events for monitoring at least one of an upload, a download and a drop by the process based on a result of the determination; and an audit trail storage unit for storing information about occurrence of the activated monitoring event as an audit trail.

Here, the process audit unit may activate the monitoring event including at least one of an executable file creation monitoring event, a user selection download monitoring event, a file upload monitoring event, a file creation monitoring event, and an abnormal behavior monitoring event.

Here, the process audit unit may activate at least one of the file upload monitoring event and the user selection download monitoring event when the process is a monitoring target process and when the process is a browser process.

Here, the process audit unit may activate the executable file creation monitoring event when the process is a monitoring target process and when the process is a document-viewer process.

Here, the process execution detection unit may determine whether an audit trail corresponding to the process is stored when it is determined that the process is not a monitoring target process.

Here, the process audit unit may activate at least one of an event for monitoring termination of the process, the file creation monitoring event, and the abnormal behavior monitoring event when it is determined that the audit trail corresponding to the process is stored.

Here, the process execution detection unit may detect the execution of the process inside the virtual machine based on a system call provided by a kernel of a guest operating system in the virtual machine.

Here, the process execution detection unit may set a breakpoint on a system call that is invoked when a process is executed, and may acquire a structure address that points to information about the process when the set breakpoint is hit.

Here, the process audit unit may search for a virtual address of a library loaded by the monitoring target process using the acquired structure address, and may set an API breakpoint at an address of a user API that is called when the monitoring event occurs.

Here, the process audit unit may check a monitoring target process context with reference to a register of the virtual machine when the API breakpoint is hit, and may deliver information about occurrence of the monitoring event, corresponding to the address at which the API breakpoint is set, to the audit trail storage unit when the process is determined to be a monitoring target process; and the audit trail storage unit may store the information about the occurrence of the monitoring event as the audit trail.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
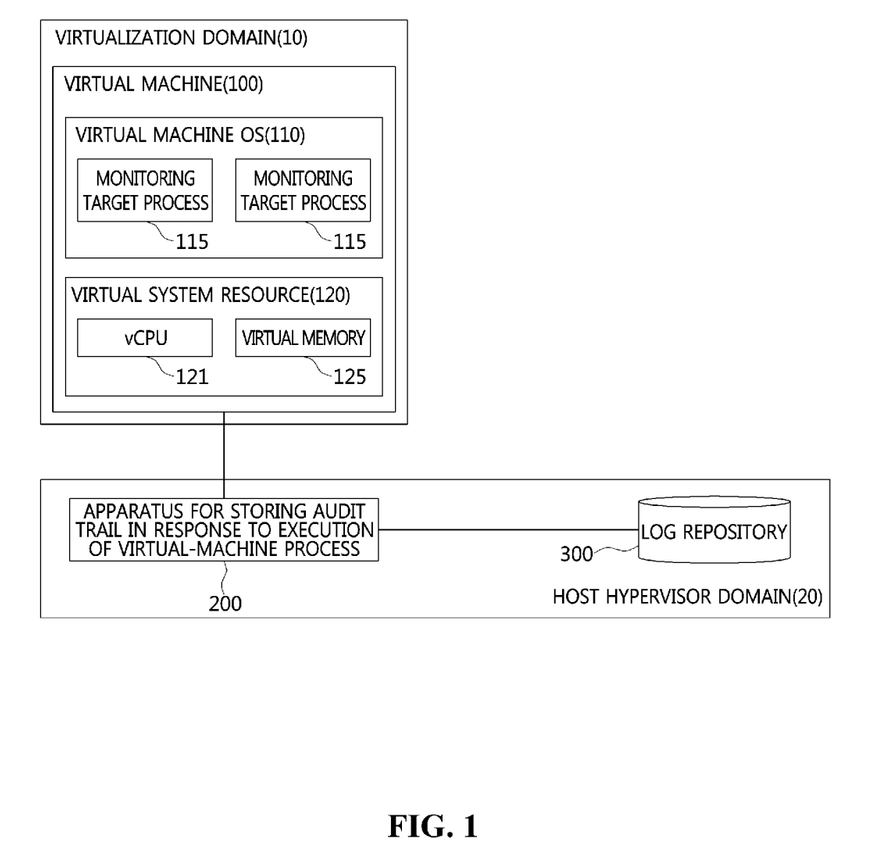
FIG. 1 is a view that schematically shows an environment in which an apparatus for storing an audit trail in response to the execution of a virtual-machine process according to an embodiment of the present invention is applied.

FIG. 1 is a view that schematically shows an environment in which an apparatus for storing an audit trail in response to the execution of a virtual-machine process according to an embodiment of the present invention is applied.

As illustrated in FIG. 1, an apparatus 200 for storing an audit trail in response to the execution of a virtual-machine process according to an embodiment of the present invention may monitor virtual system resources 120 allocated to a virtual machine 100, such as a virtual CPU (vCPU) 121, virtual memory 125, and the like.

Here, the apparatus 200 for storing an audit trail in response to the execution of a virtual-machine process is run in a host hypervisor domain 20 and monitors the virtual system resources 120 allocated to the virtual machine 100 in a virtualization domain. That is, the apparatus 200 for storing an audit trail in response to the execution of a virtual-machine process according to an embodiment of the present invention operates based on a hypervisor in order to block circumvention by a malicious user or malware in the virtual machine.

The apparatus 200 for storing an audit trail in response to the execution of a virtual-machine process detects a call to a service that is invoked when a process is created in the virtual machine 100, among services in a System Service Dispatch Table (SSDT), and determines whether the created process is a monitoring target process 115.

When the execution of the monitoring target process 115 is detected, the apparatus 200 for storing an audit trail in response to the execution of a virtual-machine process activates an event for monitoring a user-space API that is called in the event of inflow or outflow of data.

Here, the apparatus 200 for storing an audit trail in response to the execution of a virtual-machine process may determine the type of the monitoring event to activate based on at least one of the type of the process and information about whether the process is a monitoring target process.

When a call to a user-space API is detected by the activated monitoring event, the apparatus 200 for storing an audit trail in response to the execution of a virtual-machine process stores information about the inflow or outflow of data, information about the execution of the incoming file, and the like in a log repository 300.

Hereinafter, the configuration of an apparatus for storing an audit trail in response to the execution of a virtual-machine process according to an embodiment of the present invention will be described in detail with reference to FIG. 2.

Figure 2:
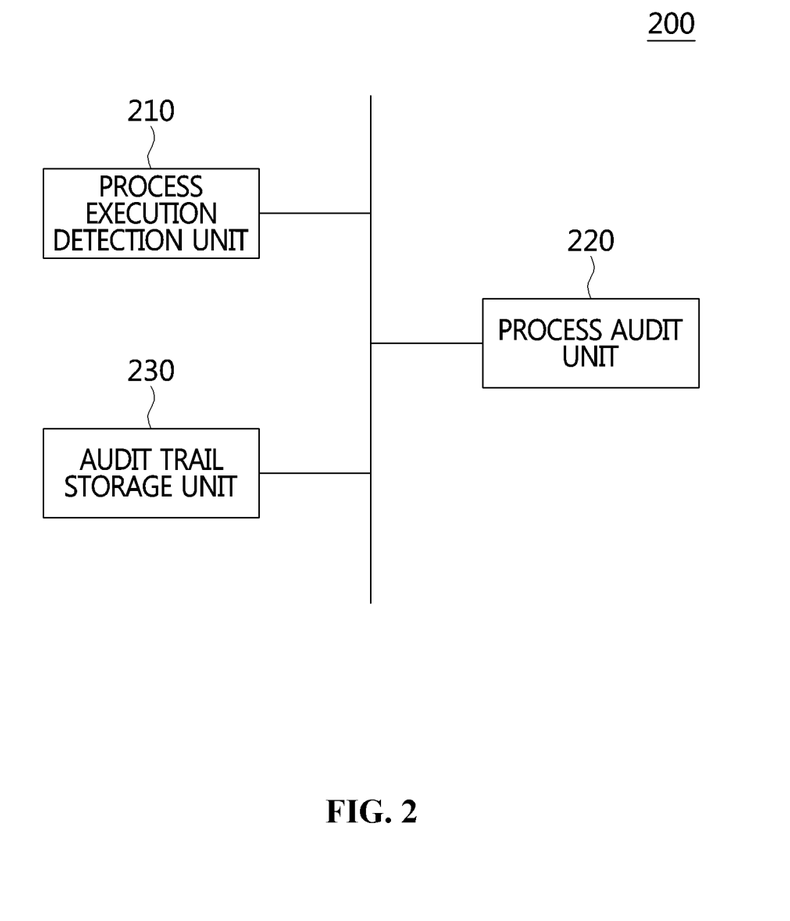
FIG. 2 is a block diagram that shows the configuration of an apparatus for storing an audit trail in response to the execution of a virtual-machine process according to an embodiment of the present invention.

FIG. 2 is a block diagram that shows the configuration of an apparatus for storing an audit trail in response to the execution of a virtual-machine process according to an embodiment of the present invention.

As shown in FIG. 2, the apparatus 200 for storing an audit trail in response to the execution of a virtual-machine process includes a process execution detection unit 210, a process audit unit 220, and an audit trail storage unit 230.

First, the process execution detection unit 210 detects at least one of execution and termination of a process in a virtual machine. The process execution detection unit 210 may monitor a process execution event and a process termination event based on a system call provided by a kernel of a guest Operating System (OS) in the virtual machine.

In a list of system calls provided by the kernel of the guest OS, the process execution detection unit 210 sets a breakpoint on a system call that is invoked when a process is executed, with reference to the register of a virtual CPU. Then, when the set breakpoint is hit, the process execution detection unit 210 acquires information about a structure that points to information about the corresponding process, thereby monitoring the process execution event.

The process execution detection unit 210 determines whether the process, the execution of which is detected, is a monitoring target process, and determines the type thereof. The process execution detection unit 210 manages a list of monitoring target processes. Accordingly, using the list, the process execution detection unit 210 may determine whether the corresponding process is a monitoring target process.

Also, when it is determined that the process, the execution of which is detected, is a monitoring target process, the process execution detection unit 210 may determine the type thereof, that is, whether the process is a browser process or a document-viewer process.

When it is determined that the process is not a monitoring target process, the process execution detection unit 210 determines whether an audit trail corresponding to the process is stored in the audit trail storage unit 230.

Here, in order to determine whether the process corresponds to an executable file entering from the outside through a monitoring target process, the process execution detection unit 210 may determine whether an audit trail corresponding to the process is stored in the audit trail storage unit 230.

When it is determined that an audit trail corresponding to the process is stored in the audit trail storage unit 230, the process execution detection unit 210 may determine that the process corresponds to an executable file entering from the outside through the monitoring target process. Conversely, when it is determined that an audit trail corresponding to the process is not stored in the audit trail storage unit 230, the process execution detection unit 210 may determine that the process is not an executable file entering from the outside through the monitoring target process.

The process audit unit 220 activates an event for monitoring the behavior of a monitoring target process based on the result of determination by the process execution detection unit 210.

After the execution of a monitoring target process is detected by the process execution detection unit 210, the process audit unit 220 may activate one or more monitoring events for monitoring at least one of an upload, a download, and a drop through the process. Also, when the activated monitoring event has occurred, the process audit unit 220 records information about the occurrence of the event and acquires additional information to be recorded as an audit trail using a parameter.

Here, the process audit unit 220 receives structure information (a structure address) from the process execution detection unit 210 and searches for the virtual address of a library loaded by the monitoring target process of the guest OS using the structure address.

Also, the process audit unit 220 sets an API breakpoint at the address of a user API that is called when a monitoring event, such as a file upload, download, drop, or the like, which is to be recorded as an audit trail, occurs.

When the set API breakpoint is hit, the process audit unit 220 checks a monitoring target process context with reference to the CR3 register of the virtual machine. When the process is a monitoring target process, the process audit unit 220 delivers information about the occurrence of the monitoring event corresponding to the breakpoint to the audit trail storage unit 230.

Here, the types of monitoring events to be stored as an audit trail may include at least one of an executable file creation monitoring event, a user selection download monitoring event, a file upload monitoring event, a file creation monitoring event, and an abnormal behavior monitoring event.

When the process, the execution of which is detected, is both a monitoring target process and a browser process, the process audit unit 220 may activate a file upload monitoring event and a user selection download monitoring event.

Also, when the process, the execution of which is detected, is both a monitoring target process and a document-viewer process, the process audit unit may activate an executable file creation monitoring event.

When the process, the execution of which is detected, is not a monitoring target process and is determined to correspond to an executable file entering from the outside through a monitoring target process, a process termination monitoring event, a file creation monitoring event, and an abnormal behavior monitoring event may be activated.

The audit trail storage unit 230 stores information about the occurrence of the activated monitoring event as an audit trail. The audit trail storage unit 230 may collect and categorize information about the occurrence of an event and additional information thereabout, and may then store the same in the log repository.

The audit trail storage unit 230 receives information about the occurrence of a monitoring event corresponding to the address at which the API breakpoint is set from the process audit unit 220 and stores (records) the same as the audit trail. That is, the audit trail storage unit 230 may store records of inflow and outflow of files, a record of the execution of a file entering from the outside, and the like as audit trails in the log repository in the host hypervisor domain.

Hereinafter, a method for storing an audit trail, performed by an apparatus for storing an audit trail in response to the execution of a virtual-machine process, according to an embodiment of the present invention will be described in detail with reference to FIG. 3 and FIG. 4.

Figure 3:
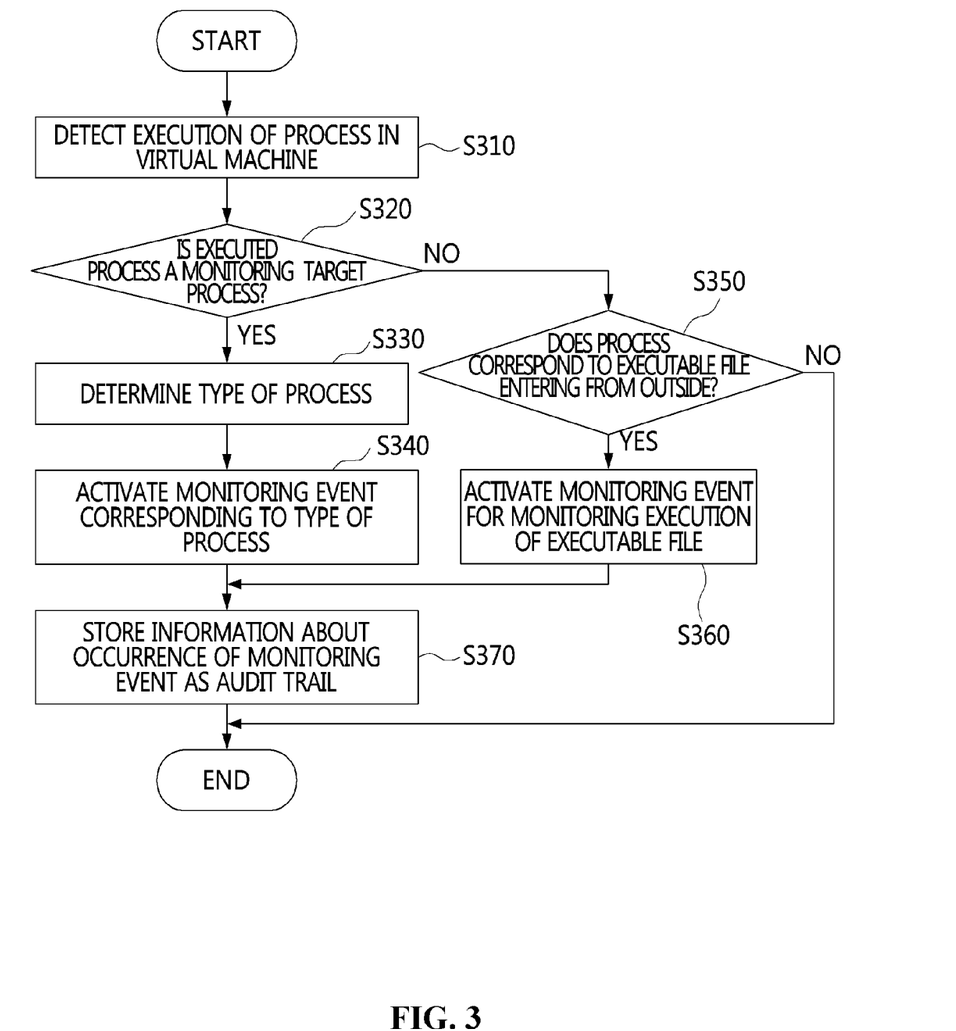
FIG. 3 is a flowchart for explaining a method for storing an audit trail in response to the execution of a virtual-machine process according to an embodiment of the present invention.

FIG. 3 is a flowchart for explaining a method for storing an audit trail in response to the execution of a virtual-machine process according to an embodiment of the present invention.

First, the apparatus 200 for storing an audit trail in response to the execution of a virtual-machine process detects the execution of a process in a virtual machine at step S310. Then, the apparatus 200 for storing an audit trail in response to the execution of a virtual-machine process determines whether the process is a monitoring target process at step S320.

Here, based on a list of monitoring target processes, the apparatus 200 for storing an audit trail in response to the execution of a virtual-machine process may determine whether the executed process is a monitoring target process.

When it is determined that the process is a monitoring target process, the apparatus 200 for storing an audit trail in response to the execution of a virtual-machine process determines the type of the process at step S330.

In order to determine the type of the monitoring event to activate, the apparatus 200 for storing an audit trail in response to the execution of a virtual-machine process may determine whether the executed process is a browser process or a document-viewer process.

Figure 4:
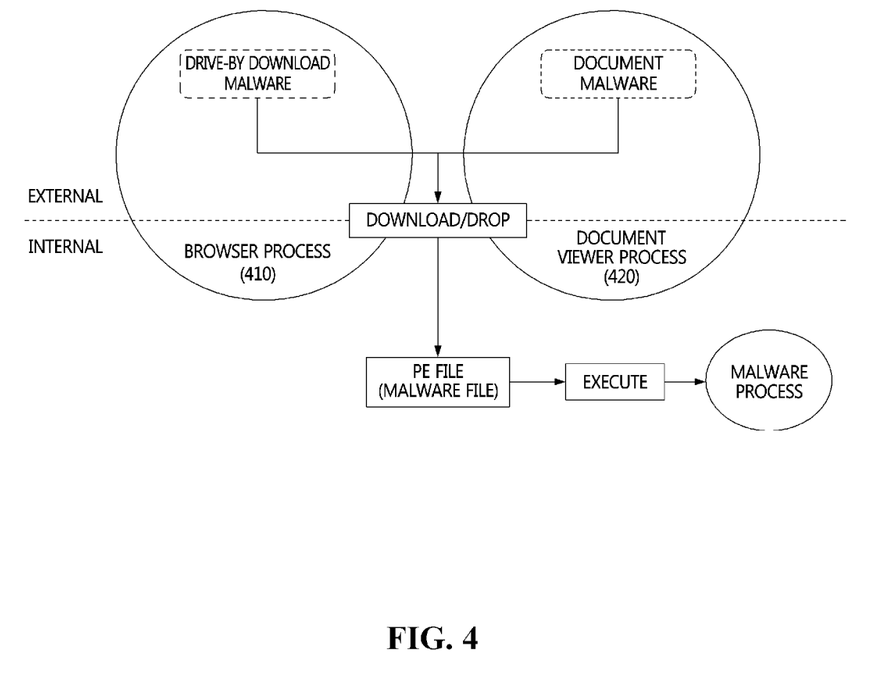
FIG. 4 is a view for explaining the case in which malware enters a system through a process.

FIG. 4 is a view for explaining an example in which malware enters a system through a process.

As illustrated in FIG. 4, malware enters a system mainly through a downloader or dropper that aims at invasion. The downloader downloads malware over a network and executes the same. The dropper is a program that is designed for installing malware, such as a virus or a backdoor, in a target system, in which case malware code can be contained within the dropper in order to avoid detection, or the dropper may download and install malware after being activated.

As malware host processes, there are a browser process 410 and a document-viewer process 420. When malware enters a system through a browser process 410, such as Internet Explorer, Chrome, or the like, it may be downloaded by a user, but may be downloaded in the state in which the user is not aware of it. A representative example of such a download is a drive-by download. Also, malware may enter a system through a document-viewer process 420, such as a pdf reader, MS office, or the like, in which case the malware may be installed using an executable file hidden in a document.

As described above, the inflow (invasion) of a malicious executable file through a normal browser process 410 or a normal document-viewer process 420 makes it difficult to detect a security incident.

Accordingly, the apparatus 200 for storing an audit trail in response to the execution of a virtual-machine process according to an embodiment of the present invention detects the execution of a process inside a virtual machine in a host hypervisor domain and determines whether the executed process is a browser process 410 or a document-viewer process 420. Then, the apparatus 200 for storing an audit trail in response to the execution of a virtual-machine process activates a monitoring event corresponding to the determined type of the process and records information about the occurrence of the monitoring event as an audit trail.

Accordingly, the apparatus 200 for storing an audit trail in response to the execution of a virtual-machine process records clues of a security incident, resulting from activities while a normal process is running, as an audit trail. Furthermore, depending on the time at which the audit trail is analyzed, the security incident may be prevented.

Referring again to FIG. 3, the apparatus 200 for storing an audit trail in response to the execution of a virtual-machine process activates a monitoring event corresponding to the type of the process at step S340.

When it is determined at step S330 that the process is a browser process, the apparatus 200 for storing an audit trail in response to the execution of a virtual-machine process may activate a file upload monitoring event in order to detect the leakage of data. Also, the apparatus 200 for storing an audit trail in response to the execution of a virtual-machine process may activate a user selection download monitoring event in order to check whether a download is intended by a user.

When it is determined at step S330 that the process is a document-viewer process, the apparatus 200 for storing an audit trail in response to the execution of a virtual-machine process may activate an executable file creation monitoring event in order to detect a download or drop of an executable file.

Meanwhile, when it is determined at step S320 that the executed process is not a monitoring target process, the apparatus 200 for storing an audit trail in response to the execution of a virtual-machine process determines whether the process corresponds to an executable file entering from the outside through a monitoring target process at step S350.

The apparatus 200 for storing an audit trail in response to the execution of a virtual-machine process may determine whether the process corresponds to an executable file entering from the outside through a monitoring target process by determining whether an audit trail corresponding to the process is stored.

Also, when an audit trail corresponding to the process is stored, the apparatus 200 for storing an audit trail in response to the execution of a virtual-machine process may determine that the process corresponds to an executable file entering from the outside through a monitoring target process. Conversely, when an audit trail corresponding to the process is not stored, the apparatus 200 for storing an audit trail in response to the execution of a virtual-machine process may determine that the process does not correspond to an executable file entering from the outside through the monitoring target process.

When it is determined that the process corresponds to an executable file entering from the outside through the monitoring target process (YES at step S350), the apparatus 200 for storing an audit trail in response to the execution of a virtual-machine process activates an event for monitor the execution of an executable file at step S360.

In order to monitor the execution of an executable file, the apparatus 200 for storing an audit trail in response to the execution of a virtual-machine process may activate at least one of a process termination monitoring event, a file creation monitoring event, and an abnormal behavior monitoring event.

When it is determined that the process does not correspond to an executable file entering from the outside through the monitoring target process, the apparatus 200 for storing an audit trail in response to the execution of a virtual-machine process may terminate the procedure of storing an audit trail.

Finally, when a monitoring event has occurred after the activation of one or more monitoring events, the apparatus 200 for storing an audit trail in response to the execution of a virtual-machine process stores information about the occurrence of the monitoring event as an audit trail at step S370.

When the activated monitoring event has occurred, the apparatus 200 for storing an audit trail in response to the execution of a virtual-machine process may acquire a file path, a file name, and the like corresponding to the process from parameters and record the same. The types of monitoring events activated by the apparatus 200 for storing an audit trail in response to the execution of a virtual-machine process and information about an audit trail recorded when the monitoring event has occurred will be described in detail with reference to FIG. 5.

Hereinafter, the types of monitoring events according to an embodiment of the present invention will be described in detail with reference to FIG. 5.

Figure 5:
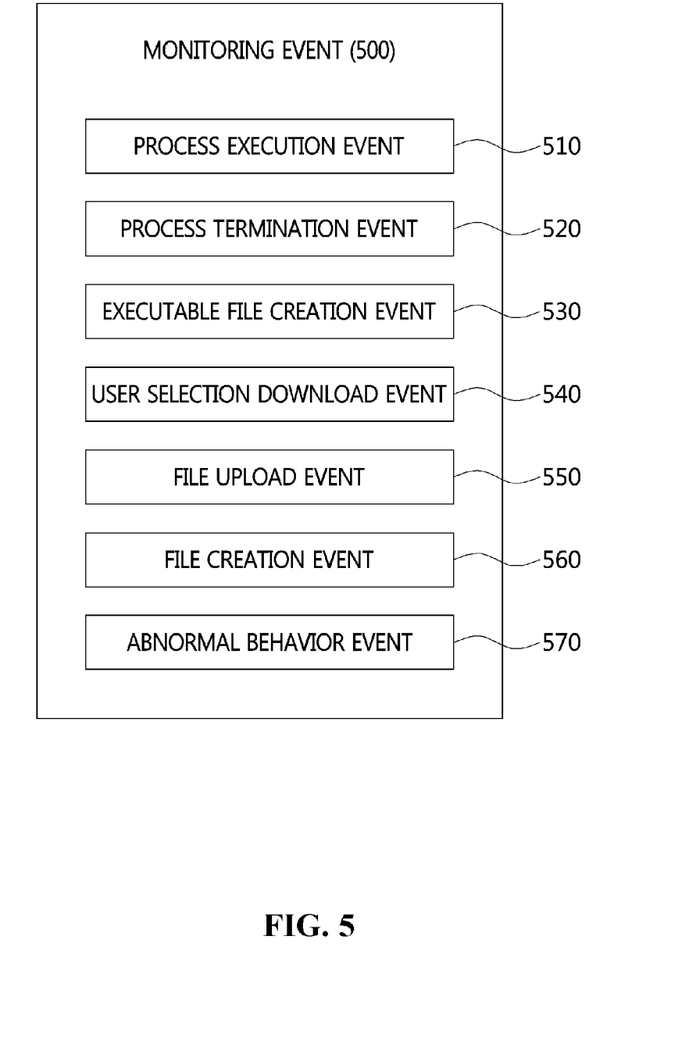
FIG. 5 is a view that shows the types of monitoring events according to an embodiment of the present invention.

FIG. 5 is a view that shows the types of monitoring events according to an embodiment of the present invention.

As shown in FIG. 5, monitoring events 500 may include a process execution event 510, a process termination event 520, an executable file creation event 530, a user selection download event 540, a file upload event 550, a file creation event 560, and an abnormal behavior event 570. The information to be acquired and recorded when each of the monitoring events 500 has occurred may be different.

First, the process execution event 510 is used to detect the execution of a user process. When the process execution event 510 has occurred, the apparatus 200 for storing an audit trail in response to the execution of a virtual-machine process may acquire information about the executed process using a parameter and determine whether the executed process is a monitoring target process based on the acquired information.

When it is determined that the process is a monitoring target process, the apparatus 200 for storing an audit trail in response to the execution of a virtual-machine process may activate another monitoring event in order to monitor the behavior of the corresponding process.

The process termination event 520 may be used to detect the termination of an executable file entering from the outside, and when the termination of the executable file is detected, the time at which the executable file is terminated may be recorded.

The executable file creation event 530 is an event for detecting a download or drop of an executable file by a monitoring target process, and when an executable file creation event has occurred, the apparatus 200 for storing an audit trail in response to the execution of a virtual-machine process may acquire the path and name of the created executable file using parameters and record the acquired information.

The user selection download event 540 is an event for monitoring whether a download through a browser process is known to and approved by a user. The user selection download event 540 is triggered when a download is performed. When the user selection download event 540 has occurred, the apparatus 200 for storing an audit trail in response to the execution of a virtual-machine process may record information about whether the download is selected by a user, acquire a file path and a file name from parameters, and record the acquired information.

The file upload event 550 is an event for monitoring leakage of a file. The file upload event 550 is triggered when a file is opened after the execution of a browser process. When a file upload event 550 has occurred, the apparatus 200 for storing an audit trail in response to the execution of a virtual-machine process may acquire the path and name of the uploaded file from parameters and record the acquired information.

The file creation event 560 is an event for monitoring the download or creation of a file as the result of the execution of an executable file entering from the outside. When the file creation event 560 has occurred, the apparatus 200 for storing an audit trail in response to the execution of a virtual-machine process may record information about the owner process of the file, the path and name of the created (downloaded) file, and the like.

The abnormal behavior event 570 is an event for monitoring abnormal behavior based on a predefined abnormal behavior list. Here, "abnormal behavior" means malicious behavior. For example, when the injection of a DLL into another process is attempted, the apparatus 200 for storing an audit trail in response to the execution of a virtual-machine process may detect a call to the user API that is used for DLL injection, acquire information thereabout using a parameter, and record the acquired information.

Hereinafter, the function and operation of an apparatus for storing an audit trail in response to the execution of a virtual-machine process according to an embodiment of the present invention will be described in detail with reference to FIG. 6 and FIG. 7.

Figure 6:
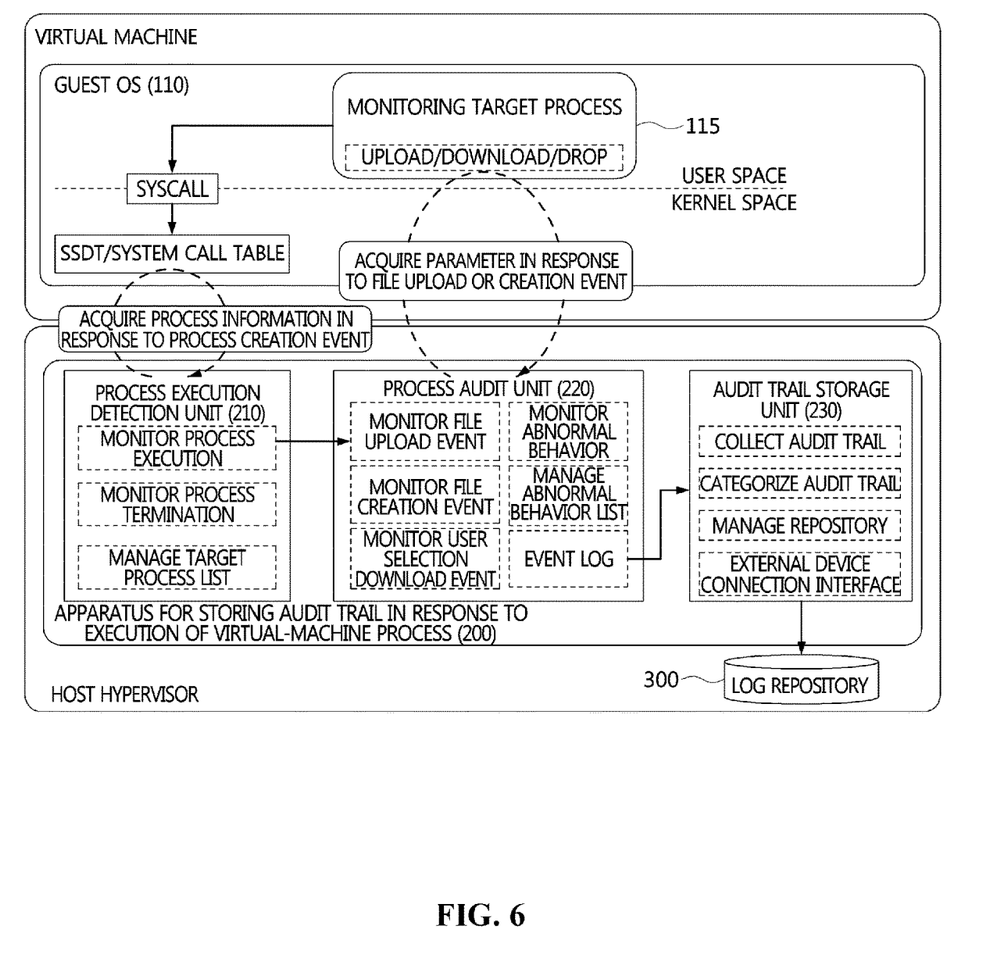
FIG. 6 is a view for explaining the function and operation of an apparatus for storing an audit trail in response to the execution of a virtual-machine process according to an embodiment of the present invention.
Figure 7:
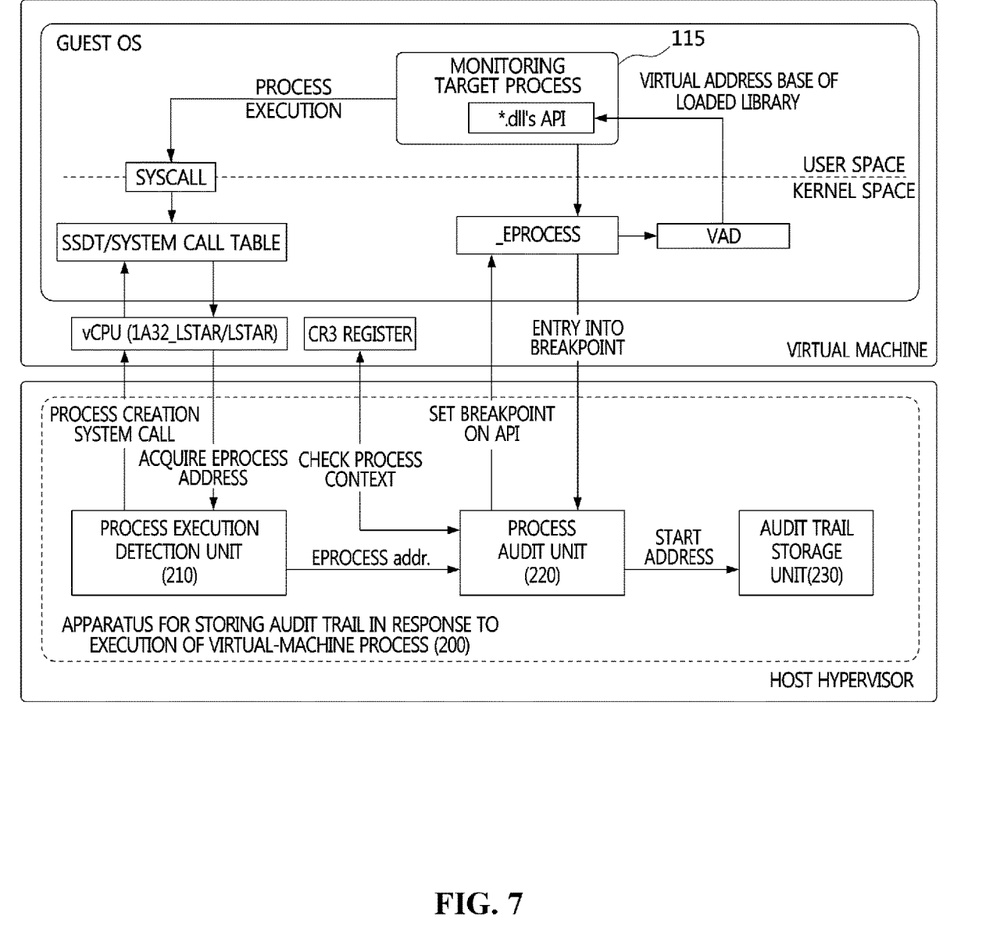
FIG. 7 is a view for explaining a procedure in which an apparatus for storing an audit trail in response to the execution of a virtual-machine process according to an embodiment of the present invention performs monitoring through a system call provided by a kernel.

FIG. 6 is a view for explaining the function and operation of an apparatus for storing an audit trail in response to the execution of a virtual-machine process according to an embodiment of the present invention, and FIG. 7 is a view for explaining a procedure in which an apparatus for storing an audit trail in response to the execution of a virtual-machine process according to an embodiment of the present invention performs monitoring through a system call provided by a kernel.

As illustrated in FIG. 6, the process execution detection unit 210 of the apparatus 200 for storing an audit trail in response to the execution of a virtual-machine process monitors the execution of a process through a process creation event and acquires information about the executed process.

The process execution detection unit 210 detects a call to a service invoked when a user process is created, among services in a System Service Dispatch Table (SSDT), thereby checking whether the created process is a monitoring target process. Also, the process execution detection unit 210 may detect a process termination event and manage a list of monitoring target processes.

As illustrated in FIG. 7, with reference to the register of a virtual CPU (vCPU), the process execution detection unit 210 sets a breakpoint on a system call that is invoked when a user process is executed, among system calls in the SSDT/System Call Table of the kernel of a guest OS. When the set breakpoint is hit, the process execution detection unit 210 acquires the address of a structure (the address of EPROCESS) that points to process information from the register of the vCPU.

When the execution of the monitoring target process is detected, the process audit unit 220 activates a monitoring event for monitoring at least one of an upload, a download, and a drop by the monitoring target process 115.

The monitoring event is for monitoring the upload, creation, and download of a file. Particularly, whether a file download is known to and approved by a user may be monitored.

The process audit unit 220 searches for the virtual address of a library loaded by a monitoring target process of a guest OS using the address of the structure (EPROCESS address). Then, the process audit unit 220 sets an API breakpoint at the address of a user API that is called when a monitoring event, such as the upload, download, or drop of a file, which is to be recorded as an audit trail, occurs.

Also, the process audit unit 220 may manage an abnormal behavior list, as shown in FIG. 6, and activate a monitoring event for monitoring abnormal behavior of a process based on the abnormal behavior list. The process audit unit 220 records information about the occurrence of the monitoring event in the audit trail storage unit 230.

When the set API breakpoint is hit, the process audit unit 220 checks a monitoring target process context with reference to the CR3 register of the virtual machine. When the process is determined to be a monitoring target process, the process audit unit 220 delivers information about the occurrence of the monitoring event corresponding to the address of the API breakpoint to the audit trail storage unit 230.

The audit trail storage unit 230 that received the information about the occurrence of the monitoring event collects and categorizes the information about the occurrence of the monitoring event and additional information thereabout, which correspond to audit trails, and stores the same in the log repository 300. Also, the audit trail storage unit 230 may manage the log repository 300 and support an external device connection interface.

As described above, the apparatus 200 for storing an audit trail in response to the execution of a virtual-machine process according to an embodiment of the present invention may detect inflow and outflow of data, which may cause a security incident, and store an audit trail in real time before the occurrence of the security incident. Also, the apparatus 200 for storing an audit trail in response to the execution of a virtual-machine process operates in a hypervisor domain outside the OS, and may monitor and record an API call and file access by a user or suspicious malware in real time.

Figure 8:
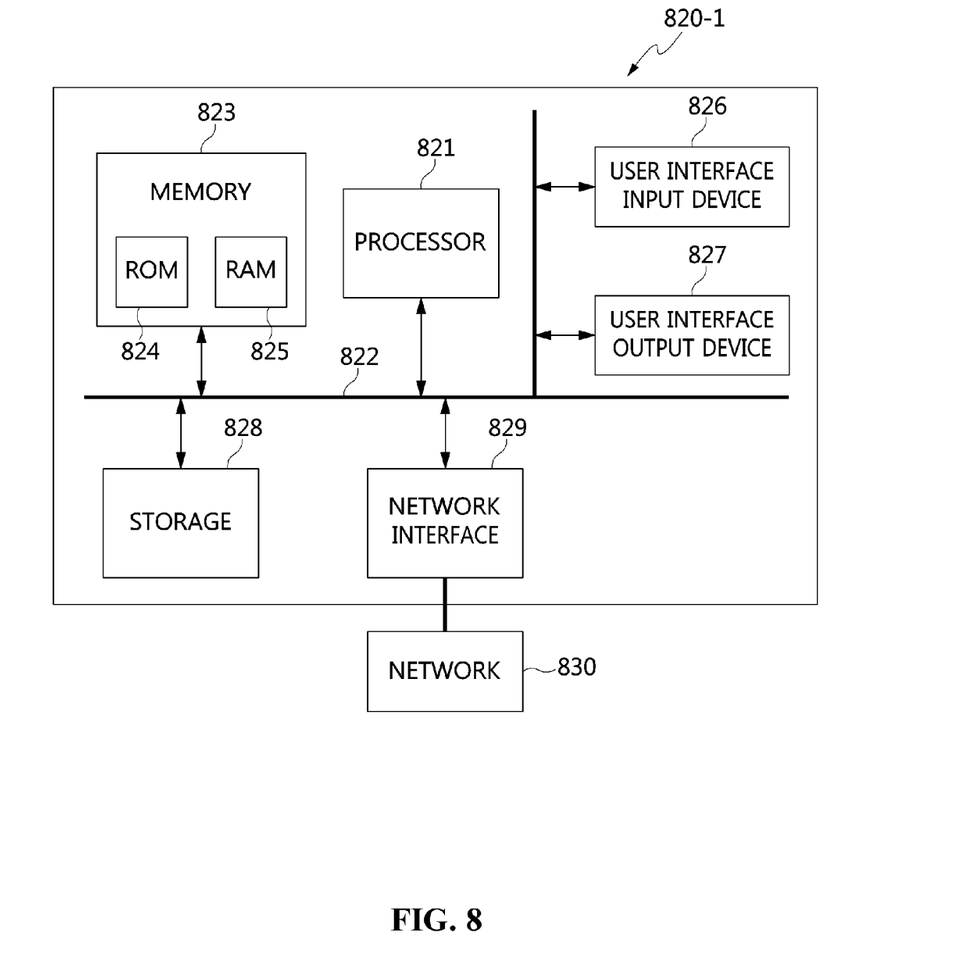
FIG. 8 is an embodiment of the present invention implemented in a computer system.

An embodiment of the present invention may be implemented in a computer system, e.g., as a computer readable medium. As shown in in FIG. 8, a computer system 820-1 may include one or more of a processor 821, a memory 823, a user interface input device 826, a user interface output device 827, and a storage 828, each of which communicates through a bus 822. The computer system 820-1 may also include a network interface 829 that is coupled to a network 830. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention, outflow and inflow of data by a user, which may cause a security incident, may be recorded in real time in a cloud-computing environment.

Also, according to the present invention, when a security incident has occurred, evidential data from the temporal vicinity of the time at which the security incident has occurred may be easily secured.

Also, according to the present invention, an audit trail storage method performed based on a hypervisor may be provided in order to solve a problem in which a malicious user or malware circumvents security measures in a virtual machine.

Also, according to the present invention, information about running processes and accessed files when a file suspected to be malware enters may be recorded in real time, and an incident caused by the file suspected to be malware may be prevented from occurring.

As described above, the apparatus and method for storing an audit trail in response to the execution of a virtual-machine process according to the present invention are not limitedly applied to the configurations and operations of the above-described embodiments, but all or some of the embodiments may be selectively combined and configured, so that the embodiments may be modified in various ways.

What is claimed is:

1. A method for storing an audit trail in response to execution of a virtual-machine process, the method being performed by an apparatus run in a host hypervisor domain for storing the audit trail and comprising:
  detecting, by the apparatus, execution of a process inside a virtual machine;

determining, by the apparatus, whether the executed process is a monitoring target process and determining a type of the process;

activating, by the apparatus, one or more monitoring events for monitoring at least one of an upload, a download, and a drop by the process based on a result of the determination; and storing, by the apparatus, information about occurrence of the activated monitoring event as an audit trail in the apparatus.

2. The method of claim 1, wherein the monitoring event includes at least one of an executable file creation monitoring event, a user selection download monitoring event, a file upload monitoring event, a file creation monitoring event, and an abnormal behavior monitoring event.

3. The method of claim 2, wherein the activating the monitoring event is configured to activate at least one of the file upload monitoring event and the user selection download monitoring event, when the process, the execution of which is detected, is the monitoring target process and when the process, the execution of which is detected, is a browser process.

4. The method of claim 2, wherein the activating the monitoring event is configured to activate the executable file creation monitoring event, when the process, the execution of which is detected, is the monitoring target process and when the process, the execution of which is detected, is a document-viewer process.

5. The method of claim 2, further comprising:
when it is determined that the process, the execution of which is detected, is not the monitoring target process, determining, by the apparatus, whether an audit trail corresponding to the process, the execution of which is detected, has been already stored in the apparatus.

6. The method of claim 5, wherein the activating the monitoring event is configured to activate at least one of an event for monitoring termination of the process, the file creation monitoring event, and the abnormal behavior monitoring event, when it is determined that the audit trail corresponding to the process, the execution of which is detected, has been already stored in the apparatus.

7. The method of claim 1, wherein the detecting the execution of the process is configured to detect the execution of the process inside the virtual machine based on a system call provided by a kernel of a guest operating system in the virtual machine.

8. The method of claim 7, wherein the detecting the execution of the process is configured to set a breakpoint on a system call that is invoked when a process is executed, and to acquire a structure address that points to information about the process when the set breakpoint is hit.

9. The method of claim 8, wherein the activating the monitoring event is configured to search for a virtual address of a library loaded by the monitoring target process using the acquired structure address, and to set an API breakpoint at an address of a user API that is called when the monitoring event occurs.

10. The method of claim 9, wherein the storing the information as the audit trail comprises:
when the API breakpoint is hit, checking a monitoring target process context with reference to a register of the virtual machine; and
when the process is determined to be a monitoring target process, storing information about the occurrence of the monitoring event, corresponding to the address of the API breakpoint, as the audit trail.

11. An apparatus for storing an audit trail in response to execution of a virtual-machine process, the apparatus being run in a host hypervisor domain and comprising:
a process execution detection unit for detecting at least one of execution and termination of a process inside a virtual machine, determining whether the process is a monitoring target process, and determining a type of the process;
a process audit unit for activating one or more monitoring events for monitoring at least one of an upload, a download and a drop by the process based on a result of the determination; and
an audit trail storage unit for storing information about occurrence of the activated monitoring event as an audit trail.

12. The apparatus of claim 11, wherein the process audit unit activates the monitoring event including at least one of an executable file creation monitoring event, a user selection download monitoring event, a file upload monitoring event, a file creation monitoring event, and an abnormal behavior monitoring event.

13. The apparatus of claim 12, wherein the process audit unit activates at least one of the file upload monitoring event and the user selection download monitoring event, when the process is the monitoring target process and when the process is a browser process.

14. The apparatus of claim 12, wherein the process audit unit activates the executable file creation monitoring event, when the process is the monitoring target process and when the process is a document-viewer process.

15. The apparatus of claim 12, wherein the process execution detection unit determines whether an audit trail corresponding to the process has been already stored in the audit trail storage unit, when it is determined that the process is not the monitoring target process.

16. The apparatus of claim 15, wherein the process audit unit activates at least one of the process termination event, the file creation monitoring event, and the abnormal behavior monitoring event, when it is determined that the audit trail corresponding to the process has been already stored in the audit trail storage unit.

17. The apparatus of claim 11, wherein the process execution detection unit detects the execution of the process inside the virtual machine based on a system call provided by a kernel of a guest operating system in the virtual machine.

18. The apparatus of claim 17, wherein the process execution detection unit sets a breakpoint on a system call that is invoked when a process is executed, and acquires a structure address that points to information about the process when the set breakpoint is hit.

19. The apparatus of claim 18, wherein the process audit unit searches for a virtual address of a library loaded by the monitoring target process using the acquired structure address and sets an API breakpoint at an address of a user API that is called when the monitoring event occurs.

20. The apparatus of claim 19, wherein:
the process audit unit checks a monitoring target process context with reference to a register of the virtual machine when the API breakpoint is hit, and delivers information about occurrence of the monitoring event, corresponding to the address of the API breakpoint, to the audit trail storage unit when the process is determined to be a monitoring target process; and the audit trail storage unit stores the information about the occurrence of the monitoring event as the audit trail.

* * * * *